United States Patent
Gomyo et al.

(10) Patent No.: US 7,063,463 B2
(45) Date of Patent: Jun. 20, 2006

(54) CONICAL HYDRODYNAMIC BEARING DEVICE AND A RECORDING DISK DRIVE EQUIPPED WITH IT, AND A METHOD OF MANUFACTURING A CONICAL HYDRODYNAMIC BEARING DEVICE

(75) Inventors: Masato Gomyo, Nagano (JP); Masayoshi Saichi, Nagano (JP); Shingo Suginobu, Nagano (JP)

(73) Assignee: Nippon Densan Co., Ltd. (JP)

( * ) Notice: Subject to any disclaimer, the term of this patent is extended or adjusted under 35 U.S.C. 154(b) by 173 days.

(21) Appl. No.: 10/866,207

(22) Filed: Jun. 10, 2004

(65) Prior Publication Data

US 2005/0031236 A1 Feb. 10, 2005

(30) Foreign Application Priority Data

Jun. 13, 2003 (JP) .............................. 2003-170083
Jun. 23, 2003 (JP) .............................. 2003-178206

(51) Int. Cl.
*F16C 17/10* (2006.01)
*B21D 53/10* (2006.01)

(52) U.S. Cl. ................................... 384/110; 29/898.02
(58) Field of Classification Search ................ 384/100, 384/110, 107, 114; 29/898.02, 898.054; 360/99.08, 98.07

See application file for complete search history.

(56) References Cited

U.S. PATENT DOCUMENTS 6,664,686 B1 * 12/2003 Ichiyama ................. 360/99.08
6,664,687 B1 * 12/2003 Ichiyama .................... 384/110

FOREIGN PATENT DOCUMENTS

| JP | 07-007886 | 1/1995 |
|----|-----------|--------|
| JP | 10-339318 | 12/1998 |
| JP | 2002-174226 | 6/2002 |
| JP | 2003-097547 | 4/2003 |

* cited by examiner

*Primary Examiner*—Thomas R. Hannon
(74) *Attorney, Agent, or Firm*—Reed Smith LLP

(57) ABSTRACT

A conical hydrodynamic bearing device comprises a shaft bush having a conical inclined dynamic pressure surface around an outer circumference thereof being relatively-rotatably inserted in a bearing sleeve having a conical inclined dynamic pressure surface around an inner circumference thereof, so that a conical inclined bearing space is created in a gap between the inclined dynamic pressure surfaces of the bearing sleeve and shaft bush. A lubricant fluid is filled inside the inclined bearing space. A proper dynamic pressure generating means is formed on at least one of the inclined dynamic pressure surfaces of the shaft bush and bearing sleeve. The lubricant fluid is pressurized by the dynamic pressure generating means to generate dynamic pressure, by which the shaft bush and the bearing sleeve are relatively elevated in the radial and thrust directions so that their rotations are supported in a non-contact manner. An open angle θ1 created by a pair of generatrixes between which a plane including the center axis of the shaft bush intersects with the inclined dynamic pressure surface of the shaft bush which is set to be larger than an open angle θ2 created by a pair of generatrixes between which a plane including said center axis of the bearing sleeve intersects with the inclined dynamic pressure surface of the bearing sleeve (θ1>θ2).

13 Claims, 12 Drawing Sheets

CONICAL HYDRODYNAMIC BEARING DEVICE AND A RECORDING DISK DRIVE EQUIPPED WITH IT, AND A METHOD OF MANUFACTURING A CONICAL HYDRODYNAMIC BEARING DEVICE

CROSS-REFERENCE TO RELATED APPLICATIONS

This application claims priority of Japanese Patent Application No. 2003-170083, filed Jun. 13, 2003 and Japanese Patent Application No. 2003-178206, filed Jun. 23, 2003, the complete disclosures of which are hereby incorporated by reference.

BACKGROUND OF THE INVENTION a) Field of the Invention

The present invention relates to a conical hydrodynamic bearing device in which a conical shaft bush and a conical bearing sleeve are relatively elevated and rotatably supported in a non-contact manner by the dynamic pressure of the lubricant fluid, a recording disk driving device equipped with such a bearing device, and a method of manufacturing a conical hydrodynamic bearing device.

b) Description of the Related Art

In recent years, hydrodynamic bearing devices in which various bodies-to-be-rotated can be supported at a high speed rotation in a stable manner have been developed. In one such device, a conical hydrodynamic bearing device, as illustrated in FIG. 1 showing an embodiment of the present invention, a shaft bush 21 having a conical inclined dynamic pressure surface is relatively rotatably inserted into a shaft sleeve 13 having a conical inclined dynamic pressure surface, and lubricant fluid such as oil is filled in the conical inclined bearing space which is created in the gap between the inclined dynamic pressure surface of the bearing sleeve 13 and the inclined dynamic pressure surface of the shaft bush 21.

Then, a dynamic pressure generating means (not illustrated) composed of properly shaped recessed grooves is cut on at least one of the inclined dynamic pressure surfaces of the shaft bush 21 and bearing sleeve 13. When the shaft bush 21 and the bearing sleeve 13 are relatively rotated, lubricant fluid is pressurized by the dynamic pressure generating means to generate dynamic pressure. Using the dynamic pressure of the lubricant fluid, the shaft bush 21 and the bearing sleeve 13 are relatively elevated in both the radial and thrust directions so that both members 21 and 13 are rotatably supported in a non-contact manner (for example, patent references 1 through 4).

Patent Reference 1: JP H7-7886 Publication
Patent Reference 2: JP H10-339318 Publication
Patent Reference 3: JP 2002-174226 Publication
Patent Reference 4: JP 2003-97547

As mentioned above, in a conical hydrodynamic bearing device, the dynamic pressure surfaces formed on the bearing sleeve and shaft bush are inclined with respect to the rotary shaft; in order to obtain a good dynamic pressure property such as the amount of relative float of both members, it is necessary to precisely establish a manufacturing tolerance for the angle of the inclination of the dynamic pressure surfaces to form the inclined dynamic pressure surfaces with high precision. Thus, the manufacturing of such inclined dynamic pressure surfaces requires time and poses problems.

Because the inclined dynamic pressure surface on the bearing sleeve and that on the shaft bush extend parallel to each other with the same inclination angle, even a small manufacturing error may greatly degrade the dynamic pressure property, possibly causing seizure and the like. For this reason, the yield decreases, resulting in expensive products.

Problems to be Solved

Since, in the above-mentioned conical hydrodynamic bearing device, the inclined dynamic pressure surfaces formed on the bearing sleeve 13 and shaft bush 21 are in the positional relationship in which they are opposed to each other while they incline in the axial direction, the positions of both members 13 and 21 in the axial direction are greatly changed even with a small manufacturing error.

Therefore, it is necessary to establish the manufacturing tolerance for the angle of the inclined dynamic pressure surfaces to be extremely precise to form the surfaces with high precision.

For example, when the bearing sleeve 13 and the shaft bush 21, formed with a proper precision as illustrated in FIG. 13, are coupled with each other, the gap between the fixed member and the rotary member in the axial direction, especially, the reference gap, AD, in the axial direction between stopper members 25 and 13d for a rotary hub 22 provided on the shaft bush 21 and the bearing sleeve 13 is maintained at a suitable gap (20 µm, for example). Consequently, backlash in the axial direction in the device on the whole can be prevented.

On the other hand, as illustrated in FIG. 14, if the outer diameter of the shaft bush 21 is formed even a little larger due to a manufacturing error, the shaft bush 21 is shifted from the bearing sleeve 13 to the upper side in the axial direction, causing an axial backlash in the entire device. When such an axial backlash occurs in a recording/reproducing disk rotation driving device, for example, the recording/reproducing disk may make contact with the recording head, possibly damaging it. For this reason, in the example of FIG. 14, a stopper member 25 on the rotary hub 22 is attached via a spacer 26 having a thickness that corresponds to the above-mentioned axial displacement. With this, the reference gap AD in the axial direction is maintained properly.

As mentioned above, it is necessary to form highly precise inclined dynamic pressure surfaces in order to manufacture a conical hydrodynamic bearing device, thus requiring more time and failing to prevent a decrease in the yield. As a result, the device becomes expensive.

OBJECT AND SUMMARY OF THE INVENTION

Therefore, an object of the present invention is to provide a conical hydrodynamic bearing device with high performance at an inexpensive cost.

To achieve the above object, in the conical hydrodynamic bearing device of the present invention, the open angle θ1 created by a pair of generatrixes between which the plane including the enter axis of the shaft bush which is relatively-rotatably inserted into the bearing sleeve intersects with the inclined dynamic pressure surface of the shaft bush, is set to be larger than the open angle θ2 created by a pair of generatrixes between which the plane including the center axis of the bearing sleeve intersects with the inclined dynamic pressure surface of the bearing sleeve (θ1>θ2).

According to the conical hydrodynamic bearing device of the invention having such a configuration, the shaft bush having the conical inclined dynamic pressure surface with a larger open angle is inserted into the bearing sleeve having the conical inclined dynamic pressure surface with a smaller open angle. Therefore, the conical inclined bearing space created between the bearing sleeve and the shaft bush is configured such that a larger space is given at the smaller diameter portion of the conical surface and a smaller space is given at the larger diameter portion.

Also, the bearing rigidity created by the dynamic pressure during rotation varies depending on the relative rotation speed between both members; the bearing rigidity at the larger diameter portion where the relative rotation speed is faster is naturally greater than that at the smaller diameter portion where the relative rotation speed is slower. Further, since the inclined bearing space at the larger diameter portion where the bearing rigidity is originally great is formed smaller than that at the smaller diameter portion, the greater bearing rigidity at the larger diameter portion is used more efficiently. Thus, a bearing property of higher rigidity can be obtained for the bearing on the whole. Consequently, even if a manufacturing error found in conventional manufacturing occurs in the manufacturing of the above-mentioned inclined dynamic pressure surface, the bearing property does not vary as much as in the conventional method and the decrease in the float is also prevented, thus easing the regulation of the manufacturing tolerance.

In the conical hydrodynamic bearing device of another form of the present invention, the dynamic pressure generating means above is composed of a collection of properly-shaped recessed grooves which are spaced at a proper pitch in the axial direction. An excellent effect can be obtained even in the conical hydrodynamic bearing device above in which the dynamic pressure generating means is composed of recessed grooves that are spaced at a proper pitch in the axial direction.

To achieve the above object, in the conical hydrodynamic bearing device in yet another form of the invention, a gap reference surface which is used for creating a reference gap between the shaft bush and the bearing sleeve in the axial direction is cut integrally with the inclined dynamic pressure surface on at least one of the members, the shaft bush or the bearing sleeve, or in a member integrated with either of the above-mentioned members, the shaft bush and bearing sleeve having the conical inclined dynamic pressure surfaces that are formed continuously with the cutting start edge along a predetermined cutting direction through a cutting process using a proper cutting tool; and a cutting reference surface used for detecting the position of the cutting tool in the radial direction and in the axial direction is formed continuously and integrally with the inclined dynamic pressure surface on either the shaft bush or bearing sleeve.

According to the conical hydrodynamic bearing device having such a configuration, when the inclined dynamic pressure surface is cut by the cutting tool, starting at the cutting start edge, the position of the cutting tool is identified through the cutting process on the cutting reference surface. Thus, the cutting of the inclined dynamic pressure surface can be performed easily with higher precision.

In the conical hydrodynamic bearing device of yet another form of the present invention, the cutting reference surface is positioned upstream or downstream in the cutting direction from the cutting start edge of the inclined dynamic pressure surface.

Also, in the conical hydrodynamic bearing device of still another form of the present invention, the cutting reference surface is formed before or after cutting the inclined dynamic pressure surface.

As in the conical hydrodynamic bearing device having such a configuration, the cutting reference surface can be cut either before or after cutting the inclined dynamic pressure surface.

In the conical hydrodynamic bearing device of a different form of the invention, the cutting reference surface includes a cylindrical annular wall which is positioned concentric with the center axis of the shaft bush and a ring-like annular flat surface which is orthogonal to the center axis of the shaft bush.

According to the conical hydrodynamic bearing having such a configuration, the position of the cutting tool can be identified in the axial direction and the direction orthogonal to the axial direction by the cylindrical annular wall and the annular flat surface. Thus, a cutting process with higher precision can be performed with certainty.

In the conical hydrodynamic bearing device of a still different form of the invention, the cutting reference surface is formed continuously with either the larger diameter end or smaller diameter end of the inclined dynamic pressure surface.

According to the conical hydrodynamic bearing having such a configuration, the inclined dynamic pressure surface can be cut from either the larger diameter side or the smaller diameter side.

In the conical hydrodynamic bearing device of another form of the invention, an axial end of the shaft bush is integrated or joined as a separate member with the holding member for a body-to-be-rotated, and the other axial end of the shaft bush projects toward the area axially outside of the holding member for the body-to-be-rotated.

According to the conical hydrodynamic bearing device immediately referred to above, the outer diameter of the point portion of the shaft bush projecting from the end of the holding member for a body-to-be-rotated can be measured easily and precisely by a measuring device such as a laser diameter measuring device, without interruption by the holding member for the body-to-be-rotated.

The recording disk drive device of still another form of the present invention comprises a spindle motor that has the conical hydrodynamic bearing device, an information recording disk mounted onto a rotor of the spindle motor, and a recording head that records or reproduces the information with respect to the recording disk.

According to the recording disk drive device having such a configuration, the above-mentioned excellent effects can be obtained even in the recording disk drive device.

In the manufacturing method of a conical hydrodynamic bearing device of the present invention, in order to cut a conical inclined dynamic pressure surface on either the shaft bush or bearing sleeve with a proper cutting tool continuously with a cutting start edge along a predetermined direction, a gap reference surface and a cutting reference surface are formed integrally and continuously with the inclined dynamic pressure surface of either the shaft bush or bearing sleeve or a member integrated with either of the above-mentioned members. The gap reference surface is used for creating a reference gap between the shaft bush and bearing sleeve in the axial direction and the cutting reference surface is used for detecting the position of the cutting tool in the radial direction and in the axial direction; the position of the cutting tool is measured through a cutting process on the cutting reference surface with the cutting tool, and the inclined dynamic pressure surface and gap reference surface are cut continuously based on the measured position of the cutting tool.

According to the manufacturing method of a conical hydrodynamic bearing device having such a configuration, in order to cut the inclined dynamic pressure surface from the cutting start edge with the cutting tool, the cutting reference surface is first cut to identify the position of the cutting tool, and thus the inclined dynamic pressure surface can be cut easily and more precisely.

In the manufacturing method of a conical hydrodynamic bearing device of another aspect of the invention, the cutting reference surface of a form described above is located upstream or downstream in the cutting direction from the cutting start edge of the inclined dynamic pressure surface.

In the manufacturing method of a conical hydrodynamic bearing device, the cutting reference surface of a different form described above is formed before or after cutting the inclined dynamic pressure surface.

According to the manufacturing method of a conical hydrodynamic bearing device having such a configuration, the cutting reference surface can be cut either before or after the cutting of the inclined hydrodynamic pressure surface.

In the manufacturing method of a conical hydrodynamic bearing device of yet another form of the invention, the cutting reference surface and inclined dynamic pressure surface of a form discussed above are cut by the same cutting tool.

According to this manufacturing method of a conical hydrodynamic bearing device, the inclined dynamic pressure surface can be cut from the position perfectly corresponding to the position of the cutting tool identified by the cutting reference surface. Thus, the above-mentioned effect can be obtained with certainty.

DESCRIPTION OF THE PREFERRED EMBODIMENTS

The embodiments of the present invention will be described in detail based on the drawings. Prior to the description of the embodiments, a spindle motor for a hard disk drive (HDD) having a conical hydrodynamic bearing device to which the present invention is applied is first described.

Figure 1:
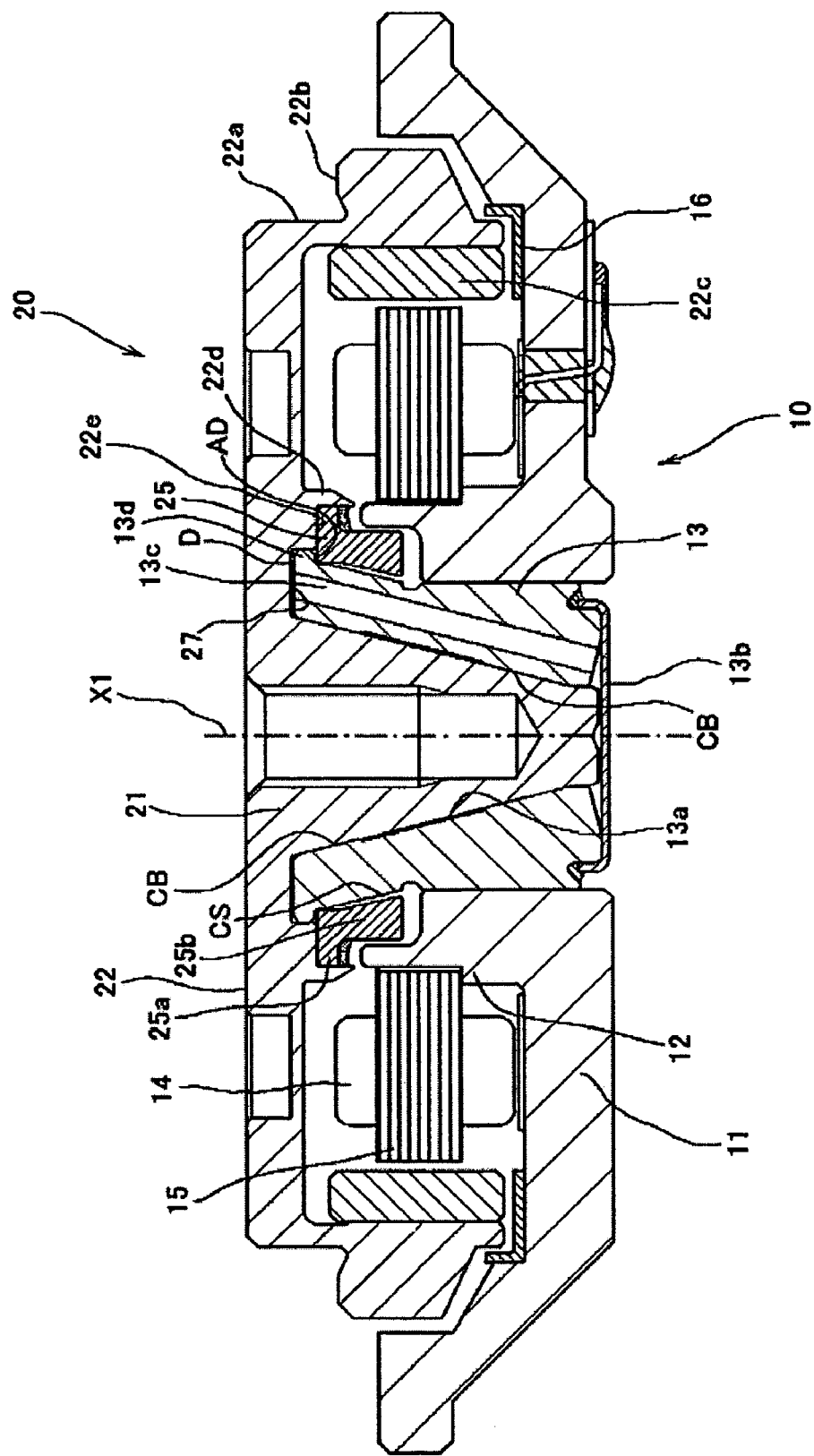
FIG. 1 is a vertical cross section of a spindle motor for shaft rotary type having a conical hydrodynamic bearing device of an embodiment of the present invention.

A shaft-rotating/outer rotor-type spindle motor illustrated in FIG. 1 comprises a stator assembly 10, which is a fixed member, and a rotor assembly 20, which is a rotary member coupled to the stator assembly 10 from the top of the figure.

The stator assembly 10 has a base frame 11 to be screwed into a main plate of a hard disk drive (HDD) that is described later. On the inner circumference of the cylindrical sleeve holding portion (bearing member holder) formed in the center portion of the base frame 11, a hollow bearing sleeve 13 is integrally joined with the base frame 11 by a fixing means such as press fit or shrinkage fit. The bearing sleeve 13, composed of a copper material such as phosphor bronze for simplified manufacturing, has a conical bearing center hole 13a that has openings at both ends in the axial direction. Also, a stator core portion 15 in which a stator coil 14 is wound around a salient-pole of a stator core projecting in the radial direction is fitted to the outer circumference of the sleeve holding portion 12.

Figure 2:
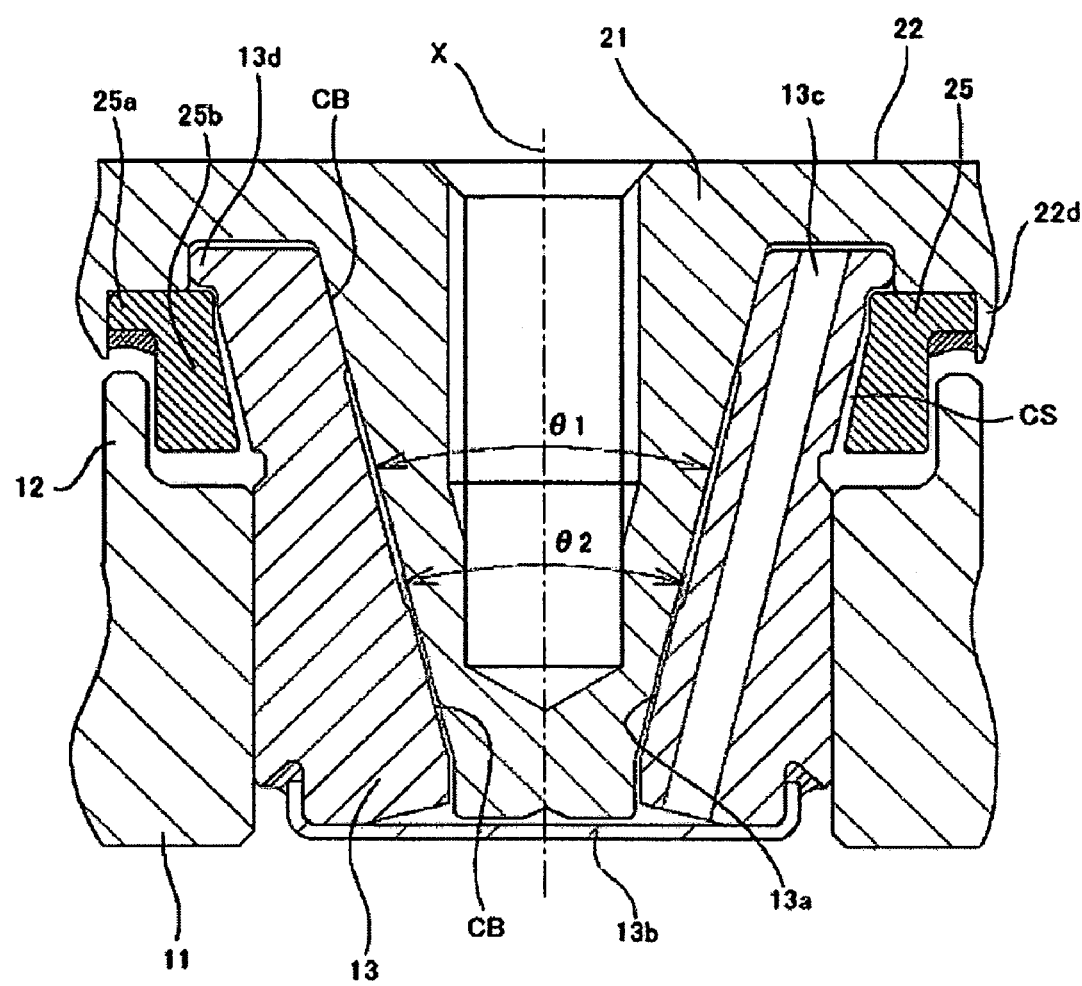
FIG. 2 is a vertical cross section of an enlarged structure of a conical hydrodynamic bearing portion used in the HDD spindle motor of FIG. 1.

Specifically as illustrated in FIG. 2, a shaft bush 21, which is a shaft member configuring a portion of the rotor assembly 20, is inserted in the bearing center hole 13a of the bearing sleeve 13 such that it freely rotates around the central rotation axis X1. The shaft bush 21 of this embodiment is composed of conically-shaped stainless steel to correspond to the shape of the bearing center hole 13a of the bearing sleeve 13.

A conical inclined dynamic pressure surface is formed on the inner circumference of the bearing center hole 13a of the bearing sleeve 13, and another conical inclined dynamic pressure surface is also formed on the outer circumference of the shaft bush 21. Note that, in the axial center portion of the inclined dynamic pressure surface on the bearing sleeve 13, an annular depression used as an oil reservoir is formed like a belt.

Also, an inclined bearing space is formed in the small gap between the opposing, inclined dynamic pressure surfaces on the bearing sleeve 13 and shaft bush 21. In the inclined bearing space, the conical hydrodynamic bearing portions, CB and CB, are created at two places in the axial direction, spaced at a proper pitch. More specifically, the inclined dynamic pressure surface on the bearing sleeve 13 and that on the shaft bush 21 in each conical hydrodynamic bearing portion CB are opposed to each other via the inclined bearing space of several μm in which an ester type or poly-α olefin type lubricant oil is filled without interruption.

The opening at the bottom end of the bearing sleeve 13 in the figure is covered and sealed by a cover 13b, by which the lubricant oil inside the conical hydrodynamic bearing portions CB is prevented from leaking outside.

Further, a dynamic pressure generating means having a herringbone-shaped recess structure (not illustrated) is cut in two blocks in the axial direction on at least one of the inclined dynamic pressure surfaces on the bearing sleeve 13 and shaft bush 21. When the shaft bush 21 is rotated, the lubricant oil is pressurized by the pumping action of the dynamic pressure generating grooves to generate dynamic pressure, by which the shaft bush 21 is relatively elevated from the bearing sleeve 13 in the radial direction and in the thrust direction and is maintained in a non-contact manner. Thus, the shaft bush 21 and the rotary hub 22 integrated with the shaft bush 21 are freely rotatably supported.

The lubricant oil pressurized by the dynamic pressure generating grooves in the above manner runs out from the inclined bearing space including the conical hydrodynamic bearing portions CB. For the lubricant oil running out, a circulating hole 13c is provided passing at an angle through the drum portion of the bearing sleeve 13. Through the circulating hole 13c, the above-mentioned lubricant oil is returned to the conical hydrodynamic bearing portions CB.

As illustrated in FIG. 2, the open angle θ1 of the conical inclined dynamic pressure surface on the shaft bush 21 is defined by the angle created by a pair of generatrixes between which the plane including the central rotation axis X of the shaft bush 21 intersects with the inclined dynamic pressure surface of the shaft bush 21. The open angle θ2 of the conical inclined dynamic pressure surface on the bearing sleeve 13 is defined by the angle created by a pair of generatrixes between which the plane including the center axis of the bearing sleeve 13, i.e., the above-mentioned central rotation axis X intersects with the inclined dynamic pressure surface of the bearing sleeve 13. In this invention, the open angle θ1 at the inclined dynamic pressure surface of the shaft bush 21 is set to be larger than the open angle θ2 at the inclined dynamic pressure surface of the bearing sleeve 13 (θ1>θ2).

The rotary hub 22 as a holding member for the body-to-be-rotated, which configures the rotor assembly 20 together with the shaft bush 21, is formed in a cup shape so that various kinds of information recording media disks such as magnetic disks can be mounted thereon, and is also composed of a member integrated with the shaft bush 21. More specifically, the rotary hub 22 has an annular drum portion 22a around the outer circumference thereof to configure a rotor portion; on the annular drum portion 22a, various kinds of information recording media disks (bodies-to-be-rotated) such as magnetic disks are mounted; and an information recording medium disk is to be pressed down and held onto a disk mounting portion 22b that extends from the annular drum portion 22a to the outer side in the radial direction. Also, at the bottom portion of the cup shape of the rotary hub 22, the bottom surface 22e which is a gap reference surface (described later) is cut integrally with the inclined dynamic pressure surface of the shaft bush 21.

Further, a cylindrical rotor magnet 22c that is magnetized with NS alternately at a predetermined pitch around the circumference is fixed on the inner circumferential surface of the annular drum portion 22a, whereby the rotor portion is configured. The rotor magnet 22c is placed close to the stator core portion 15 such that it annularly opposes the outer circumference of the stator core portion 15.

The bottom end surface of the rotor magnet 22c in the axial direction axially faces a magnetic attraction plate 16 attached to the base frame 11. The entire rotary hub 22 is attracted in the axial direction by the magnetic attraction between both members 22c and 16n, providing a stable rotation.

Moreover, the top end surface of the bearing sleeve 13 in the figure and the bottom end surface of the rotary hub 22 in the center portion are arranged to closely oppose each other in the axial direction. A gap, D, is created between the axially opposing top end surface of the bearing sleeve 13 and bottom end surface of the rotary hub 22; a composite fluid seal portion, CS, which uses both capillary force and rotational centrifugal force to seal the oil, is provided at the outer circumference of the gap D (the bearing sleeve 13).

The composite fluid seal portion, CS, is formed being connected to the gap D and extending from the gap D to the outside in the radial direction. The inner circumferential inclined wall and outer circumferential inclined wall of the composite fluid seal portion CS are respectively the outer circumferential surface of the bearing sleeve 13 and the inner circumferential surface of the annular drum portion 25 as a stopper member which opposes the bearing sleeve 13 from radially outside. The annular drum member 25 is composed of a ring-shaped annular member. A plate-like hub mounting portion 25a, configuring the outer circumferential portion of the annular drum member 25, is fixed to a fixing portion 22d provided to the rotary hub 22.

A stopper engaging flange portion 13d is provided at the top end of the bearing sleeve 13 in the figure to project to the outside in the radial direction, and is arranged such that a portion thereof is axially opposed to the top surface of the main portion 25b of the annular drum member 25. Because those members 13d and 25b are arranged in such a way that they are able to contact each other in the axial direction, the rotary hub 22 is prevented from coming off in the axial direction. In other words, the above-mentioned hub mounting portion 25a of the annular drum member 25 is arranged radially outside of the stopper engaging flange portion 13d of the bearing sleeve 13 such that the inner circumferential wall of the hub mounting portion 25a of the annular drum member 25 faces the outer circumferential wall of the stopper engaging flange portion 13d from the outside in the radial direction.

Thus, in this embodiment, the shaft bush 21 having the conical inclined dynamic pressure surface that makes a wider open angle θ1 is inserted into the bearing sleeve 13 having the conical inclined dynamic pressure surface that makes a narrower open angle θ2. Therefore, the conical inclined bearing space created between the bearing sleeve 13 and the shaft bush 21 is wider at the smaller diameter portion on the lower side of the figure and is narrower at the larger diameter portion on the upper side of the figure.

The bearing rigidity created by the dynamic pressure of the lubricant oil during rotation increases/decreases depending on the relative rotational speed between both members 13 and 21. Therefore, the bearing rigidity at the larger diameter portion on the upper side of the figure, at which the relative rotational speed is large, is larger than that at the smaller diameter portion on the lower side of the figure, at which the relative rotational speed is small. Since the inclined bearing space at the larger diameter portion, at which the bearing rigidity is originally great, is formed smaller than the space at the smaller diameter portion, the larger bearing rigidity at the larger diameter portion is used more efficiently. Consequently, a bearing property of higher rigidity can be obtained for the bearing on the whole. Even if a conventional manufacturing error occurs during the manufacturing of the inclined dynamic pressure surface, the bearing property varies less than usual, preventing the decrease of the amount of float. Thus, the manufacturing tolerance can be less restricted.

Figure 3:
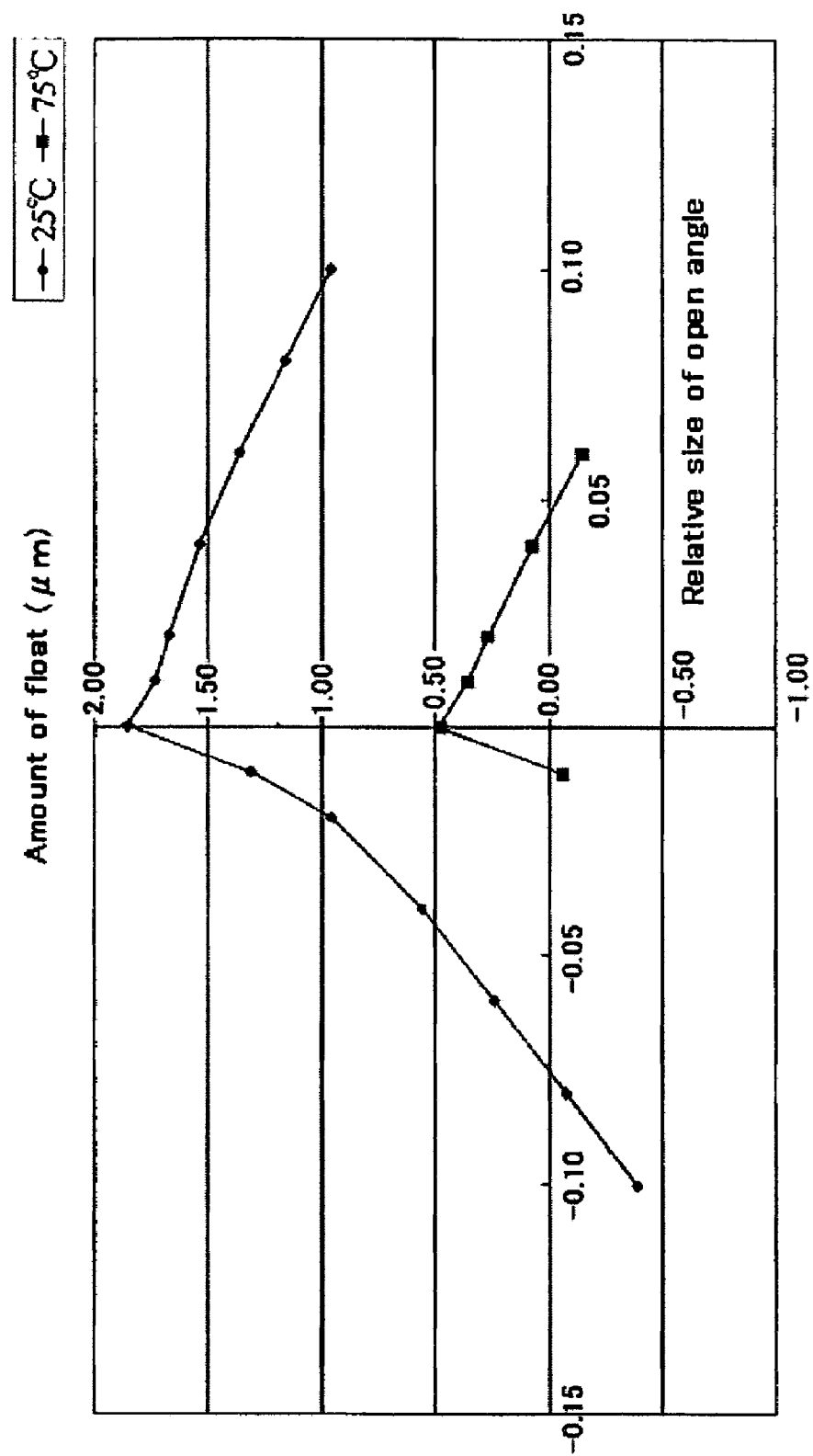
FIG. 3 is a linear diagram showing the relationship between the relative size of the open angle θ1 of the shaft bush with respect to the angle θ2 of the bearing sleeve as a base (zero) and the amount of the float of the rotor assembly including the shaft bush.

In FIG. 3, the horizontal axis is the relative size of the open angle θ1 of the shaft bush 21 when the angle θ2 of the bearing sleeve 13 is a base (zero), the vertical axis is the amount of float of the rotor assembly 20 including the shaft bush 21, and a parameter is the ambient temperature (at 25° C. and 75° C.). The maximum amount of float is obtained at the original point at which the open angle θ1 of the shaft bush 21 is equal to the open angle θ2 of the bearing sleeve. However, it is impossible to form the open angles θ1 and θ2 as to be exactly equivalent; even when the open angles θ1 and θ2 are designed to be the equivalent, a manufacturing error eventually occurs in the left side of the figure, i.e., in the area where the angle θ1 of the shaft bush 21 is smaller than the angle θ2 of the bearing sleeve 13 or in the right side of the figure, i.e., in the area where the angle θ1 of the shaft bush 21 is larger than the angle θ2 of the bearing sleeve 13.

In the area on the left side of FIG. 3, in which the angle θ1 of the shaft bush 21 is smaller than the angle θ2 of the bearing sleeve 13, as the angle θ1 of the shaft bush 21 becomes smaller toward the left side of the figure, the amount of float (vertical axis) of the rotor assembly 20 decreases rapidly. On the other hand, in the area on the right side of FIG. 3, in which the angle θ1 of the shaft bush 21 is larger than the angle θ2 of the bearing sleeve 13, a greater bearing rigidity at the larger diameter portion at which the bearing rigidity is great from the beginning is used more efficiently and therefore, the rigidity is increased for the bearing on the whole. Accordingly, even if the open angle θ1 of the shaft bush 21 becomes larger toward the right side of the figure, the amount of float (vertical axis) of the rotor assembly 20 decreases slowly, not rapidly.

In the above embodiment, the open angle θ1 of the inclined dynamic pressure surface of the shaft bush 21 is designed to be larger than the open angle θ2 of the inclined dynamic pressure surface of the bearing sleeve 13 (θ1>θ2). Therefore, even if a normal manufacturing error occurs when fabricating the inclined dynamic pressure surfaces on the shaft bush 21 and bearing sleeve 13, the bearing property is maintained as in the area of the right side of FIG. 3 in which the float decreases slowly. Thus, the decrease of the amount of float [of the rotor assembly] can be less than usual, and accordingly the manufacturing tolerance can be also less restricted.

Figure 4:
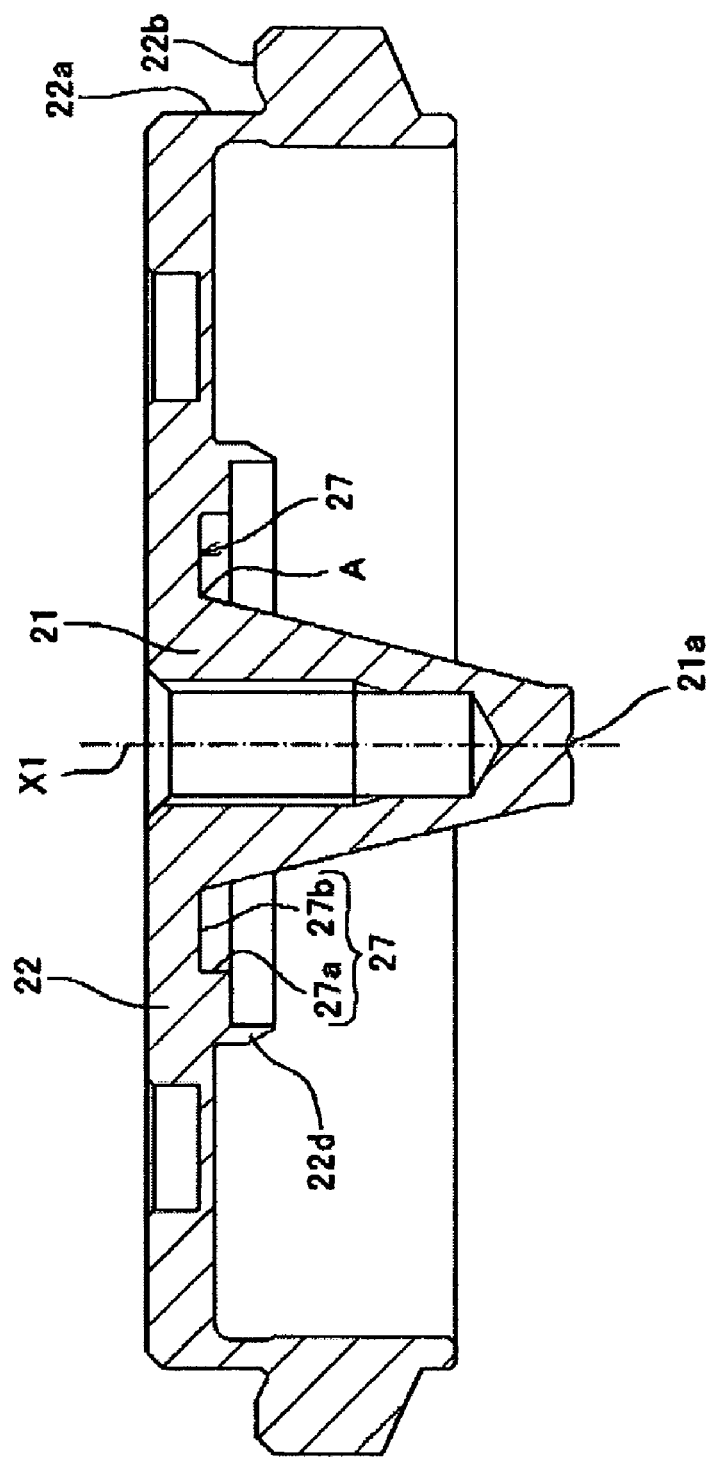
FIG. 4 is a vertical cross section showing an enlarged shaft bush with the integrated rotary hub used in the HDD spindle motor of FIG. 3.
Figure 11:
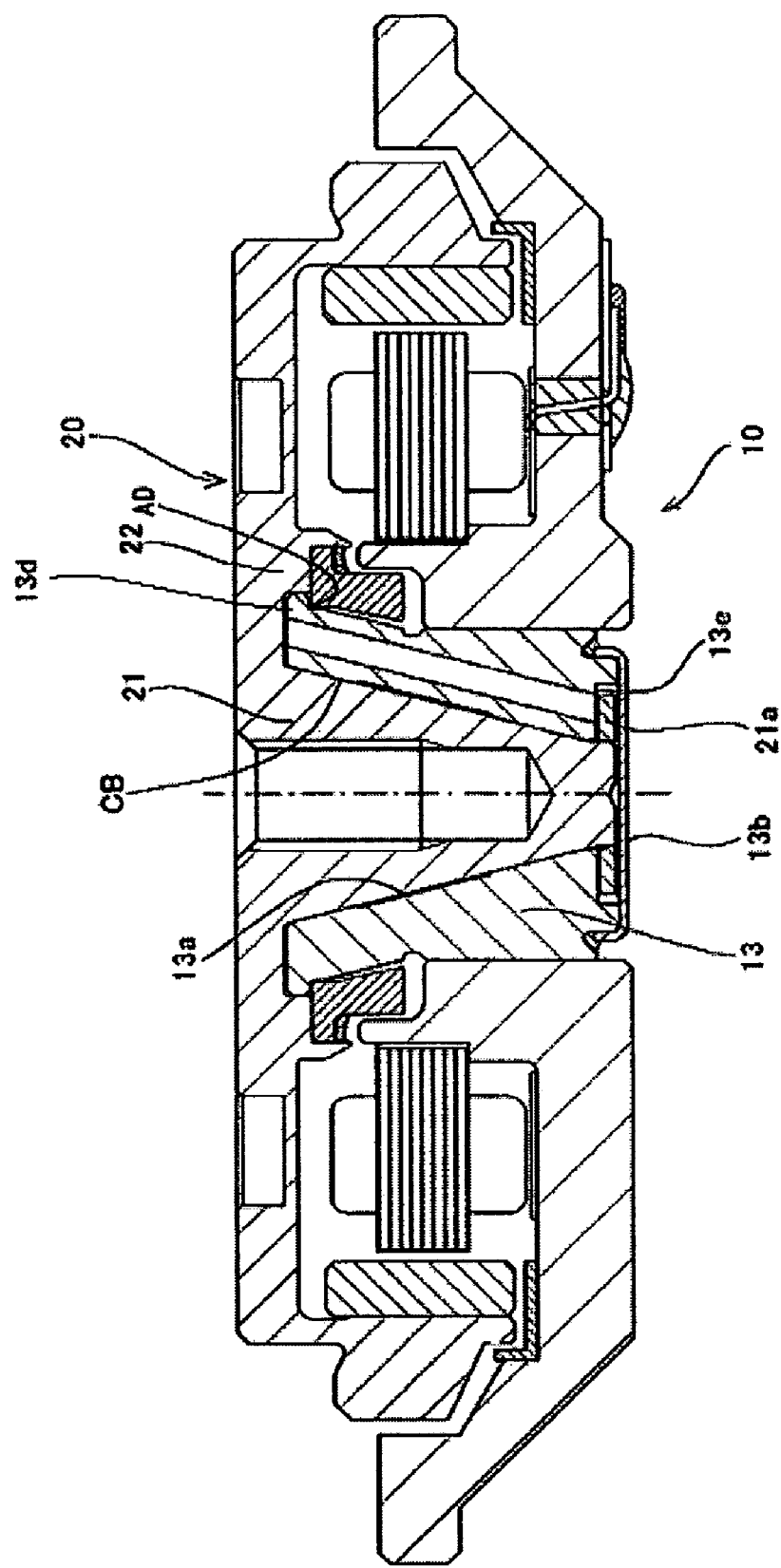
FIG. 11 is a vertical cross sectional diagram showing a shaft-rotary-type HDD spindle motor having a conical hydrodynamic bearing device in another embodiment of the present invention.

In the embodiment shown in FIG. 4 in which the same codes are given to the components corresponding to those of the hard disk drive (HDD) of FIG. 1, an annular stopper ring 21a is fixed to the tip portion of the shaft bush 21 at the bottom end of the figure. The stopper ring 21a is positioned inside a storage portion 13e formed as a recess in the center portion of the bearing sleeve 13a at the bottom end of the figure (FIG. 11). In this positional relationship, the stopper ring prevents the rotor assembly 20 from coming off. Even in such an embodiment, the same function/effects can be obtained as those in the above-mentioned embodiment.

Also, [as shown in FIG. 2,] a stopper engaging flange 13d is provided at the top end of the bearing sleeve 13 in the figure to project like a flange outside in the radial direction such that a portion thereof is axially opposed to the top surface of the main portion 25b of the annular drum member 25. Because those members 13d and 25b are arranged in such a way that they are able to contact each other in the axial direction, the rotary hub 22 is prevented from coming off in the axial direction.

Between the bottom surface of the stopper engaging flange portion 13d of the bearing sleeve 13 and the top surface of the main portion 25b of the annular drum portion 25, a reference gap, AD, is created in the axial direction. By maintaining the reference gap AD properly (about 20 μm, for example), a backlash of the entire device in the axial direction is well prevented.

In order to maintain the reference gap AD properly, since it may be easy to precisely cut the top surface of the main portion 25b of the annular drum portion 25 to obtain planarity, it is important to obtain a relative cutting precision between the bottom surface 22e of the rotary hub 22 opposing the top surface of the main portion 25b and the inclined dynamic pressure surface of the shaft bush 21. Therefore, the gap reference surface on the shaft bush side in this specification is the mounting reference surface of the annular drum portion 25, which is cut integrally with the inclined dynamic pressure surface of the shaft bush 21, i.e., the bottom surface 22e is cut integrally with the inclined dynamic pressure surface of the shaft bush 21 in this embodiment. Also, the gap reference surface on the bearing sleeve side in this specification is the bottom surface of the stopper engaging flange portion 13d in this embodiment.

Especially, as illustrated in FIG. 4, the shaft bush 21 is provided standing in the center position of the rotary hub 22 which is a holding member for a body-to-be-rotated. The larger diameter portion of the shaft bush that configures a base portion thereof is integrated with the rotary hub 22. The smaller diameter portion at the tip end, extending from the larger diameter portion of the shaft bush 21 in the axial direction, projects in the area axially outside the axial end surface (the bottom end surface of the figure) of the annular drum portion 22a of the rotary hub 22. With this configuration, the outer diameter of the projecting tip portion of the shaft bush 21 can be measured by a measuring device such as a laser diameter measuring device, without hindrance by the rotary hub 22.

Further, a recess portion 21a is formed in the projecting tip of the shaft bush 21 so that the projecting tip of the shaft bush 21 does not hinder the measurement of the axial height [of the shaft bush 21] from the disk mounting portion 22b.

The inclined dynamic pressure surface on the outer circumferential surface of the shaft bush 21 is formed continuously along a predetermined cutting direction through a cutting process (NC process) by a proper cutting tool. The inclined dynamic pressure surface in this embodiment is formed continuously from the cutting start edge A at the larger diameter portion on the base portion of the shaft bush 21 toward the smaller diameter portion at the projecting tip portion.

At a position upstream in the predetermined cutting direction from the cutting start edge A of the inclined dynamic pressure surface, that is, in the area circumferentially outside of the larger diameter portion at the root base portion of the shaft bush 21, a cutting reference surface 27 is provided for detecting the position of the cutting tool in advance. The cutting reference surface 27 consists of a cylindrical annular wall 27a used for detecting the position of the cutting tool in the radial direction and a ring-like annular flat surface 27b used for detecting the position of the tool in the axial direction. The cylindrical annular wall 27a and the ring-like annular flat surface 27b are cut integrally and continuously with the inclined dynamic pressure surface.

More specifically, the cylindrical annular wall 27a, configuring the cutting reference surface 27 in the radial direction, is formed to be concentric with the center axis X1 of the shaft bush 21, and is positioned to concentrically surround the larger diameter portion of the shaft bush 21 at the root base portion from the outside in the radial direction. Also, the ring-like annular flat surface 27b, configuring the cutting reference surface 27 in the axial direction, is configured by a flat surface orthogonal to the center axis X1 of the shaft bush 21 and extends to connect the cutting start edge A of the inclined dynamic pressure surface and the cylindrical annular wall 27a.

Prior to the cutting of the inclined dynamic pressure surface of the shaft bush 21 through a cutting process with a proper cutting tool, the cylindrical annular wall 27a and ring-like annular flat surface 27b, both of which configure the cutting reference surface 27, are first cut by the same cutting tool. When the cutting reference surface 27 is cut, the position of the cutting tool in use is measured in the axial direction and in the radial direction; based on the measurement result of the cutting tool, the inclined dynamic pressure surface is cut continuously from the cutting start edge A to easily obtain a highly precise inclined dynamic pressure surface.

Especially in this embodiment, since the above-mentioned cutting reference surface 27 and inclined dynamic pressure surface are cut by the same cutting tool, the highly precise cutting can be performed easily with certainty. However, different cutting tools may be used to cut the different surfaces.

As described above, when the inclined dynamic pressure surface on the shaft bush 21 is cut from the cutting start edge A by the cutting tool in this embodiment, the cutting reference surface 27 is cut in advance before starting the cutting of the inclined dynamic pressure surface from the cutting start edge A; at that time, the position of the cutting tool is identified. The cutting of the inclined dynamic pressure surface which is performed after identifying the position of the tool is easy, certain, and highly precise.

In this embodiment, especially, the above-mentioned cutting reference surface 27 consists of the cylindrical annular wall 27a, which is positioned to be concentric with the center axis of the shaft bush 21, and the ring-like annular flat surface 27a, which is orthogonal to the center axis of the shaft bush 21. Therefore, the position of the cutting tool is identified in two directions, the axial direction and the direction orthogonal to the axial direction. Thus, a more precise cutting can be performed with certainty.

In the above embodiment, since the cutting reference surface 27 and inclined dynamic pressure surface on the shaft bush 21 are cut by the same tool, the cutting of the inclined dynamic pressure surface can be performed in a perfectly corresponding positional relationship with the cutting reference surface 27. Thus, the above-mentioned function can be obtained with certainty.

Figure 5:
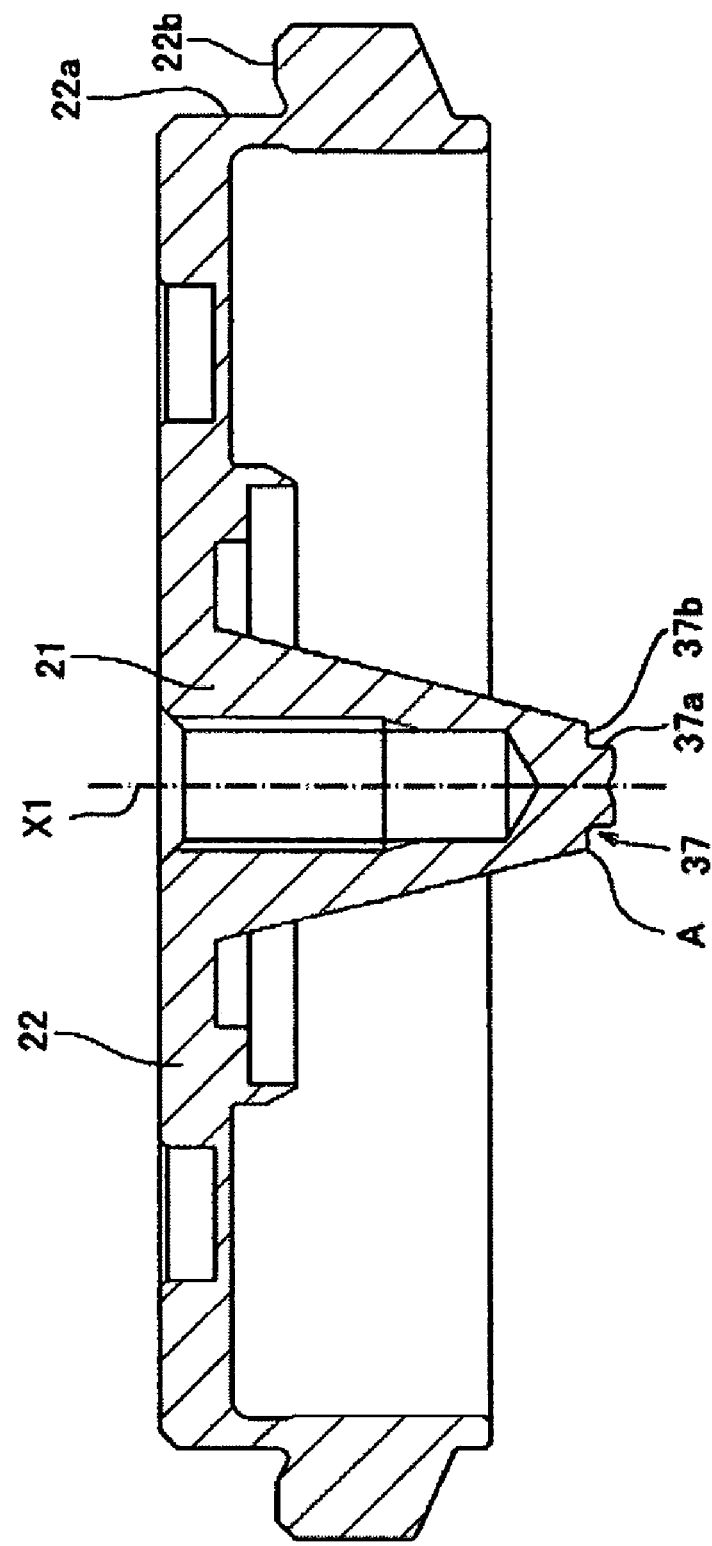
FIG. 5 is a vertical cross section showing an enlarged shaft bush with the integrated rotary hub used in another embodiment of the present invention.

In the embodiment shown in FIG. 5 in which the same codes are given to the same components in the above-described embodiments, the cutting start edge A is positioned at the smaller diameter portion of the shaft bush 21, which is the projecting tip end portion of the shaft bush 21, so that [the inclined dynamic pressure surface of] the shaft bush 21 can be cut in the direction from the smaller diameter portion to the larger diameter portion. Upstream in such a cutting direction from the cutting start edge A, that is, at the furthest point on the edge of the shaft bush 21, a cylindrical annular wall 37a and a ring-like annular flat surface 37b, together which configure the cutting reference surface 37, are provided around the outer circumference of the shaft bush 21.

To cut the inclined dynamic pressure surface on the shaft bush 21 by starting at the cutting start edge A, the above-mentioned cylindrical annular wall 27a and ring-like annular flat surface 27b are first cut as the cutting reference surface 27 so that the position of the cutting tool can be identified. With the identified position of the tool, a high precision in cutting the inclined dynamic pressure surface can be obtained easily.

As described above, in the present invention, the cutting start edge A of the inclined dynamic pressure surface can be provided either at the larger diameter end or smaller diameter end. Thus, the inclined dynamic pressure surface can be cut in the same manner from either end (the larger diameter end or smaller diameter end) of the inclined dynamic pressure surface.

In this embodiment, the smaller diameter portion on the tip end side of the shaft bush 21 extending from the larger diameter portion in the axial direction projects toward the area axially outside of the axial end surface (the bottom surface of the figure) of the annular drum portion 22a of the rotary hub 22; since the cutting reference surface 37 is provided at the projecting portion, it can be measured easily without hindrance by the rotary hub 22.

Figure 6:
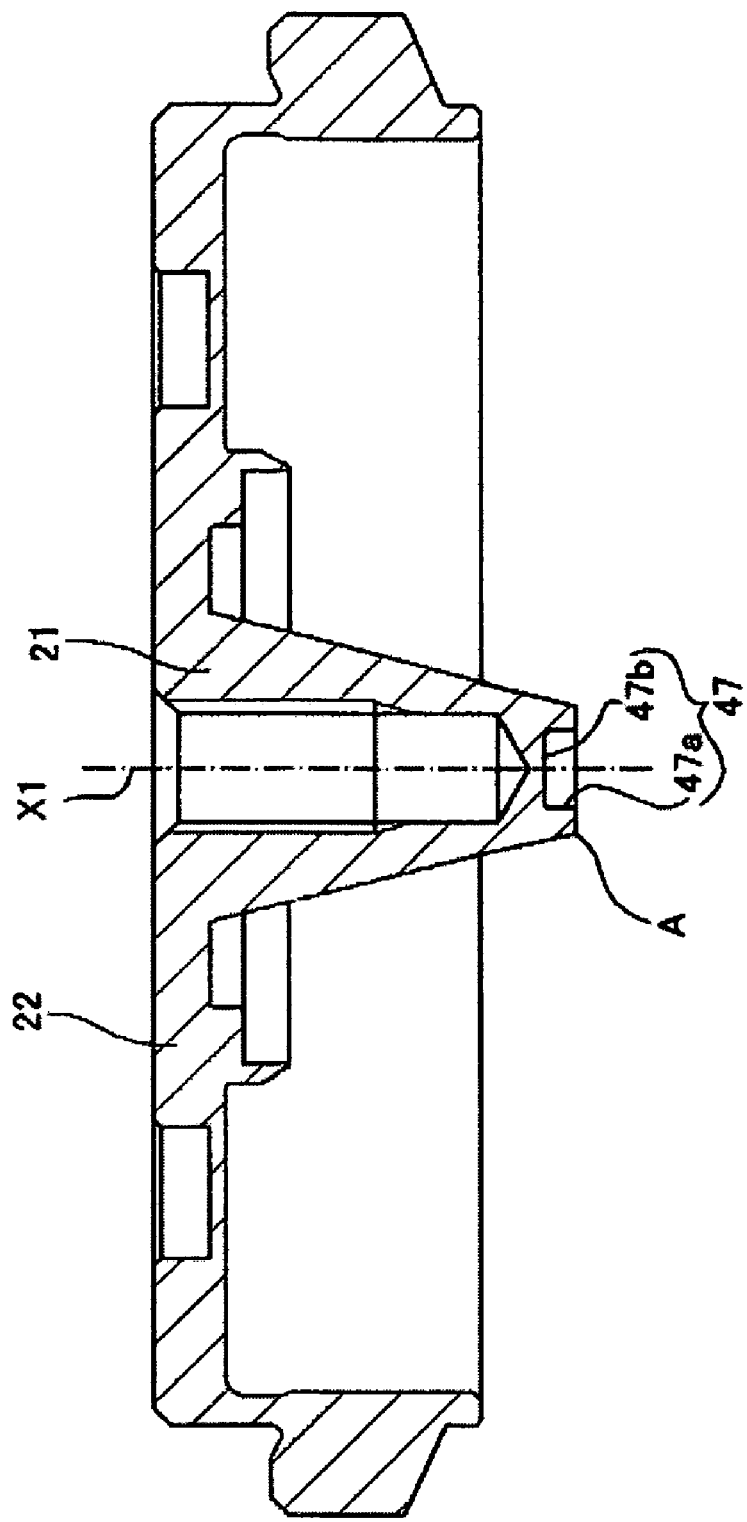
FIG. 6 is a vertical cross section showing an enlarged shaft bush with the integrated rotary hub used in another embodiment of the present invention.

In the embodiment shown in FIG. 6 in which the same codes are given to the same components in the above embodiments, the cutting start edge A is also provided at the smaller diameter portion of the shaft bush 21, i.e., at the projecting tip end portion of the shaft bush 21. In this embodiment, the cylindrical annular wall 47a and ring-like annular flat surface 47b, together which configure a cutting reference surface 47, are formed as a recess inside the projecting tip end of the shaft bush 21.

Even in this embodiment, the same function/effect as in each embodiment described above can be obtained. This embodiment is especially effective in an ultra-thin conical hydrodynamic bearing device which is made small in the axial direction.

Figure 7:
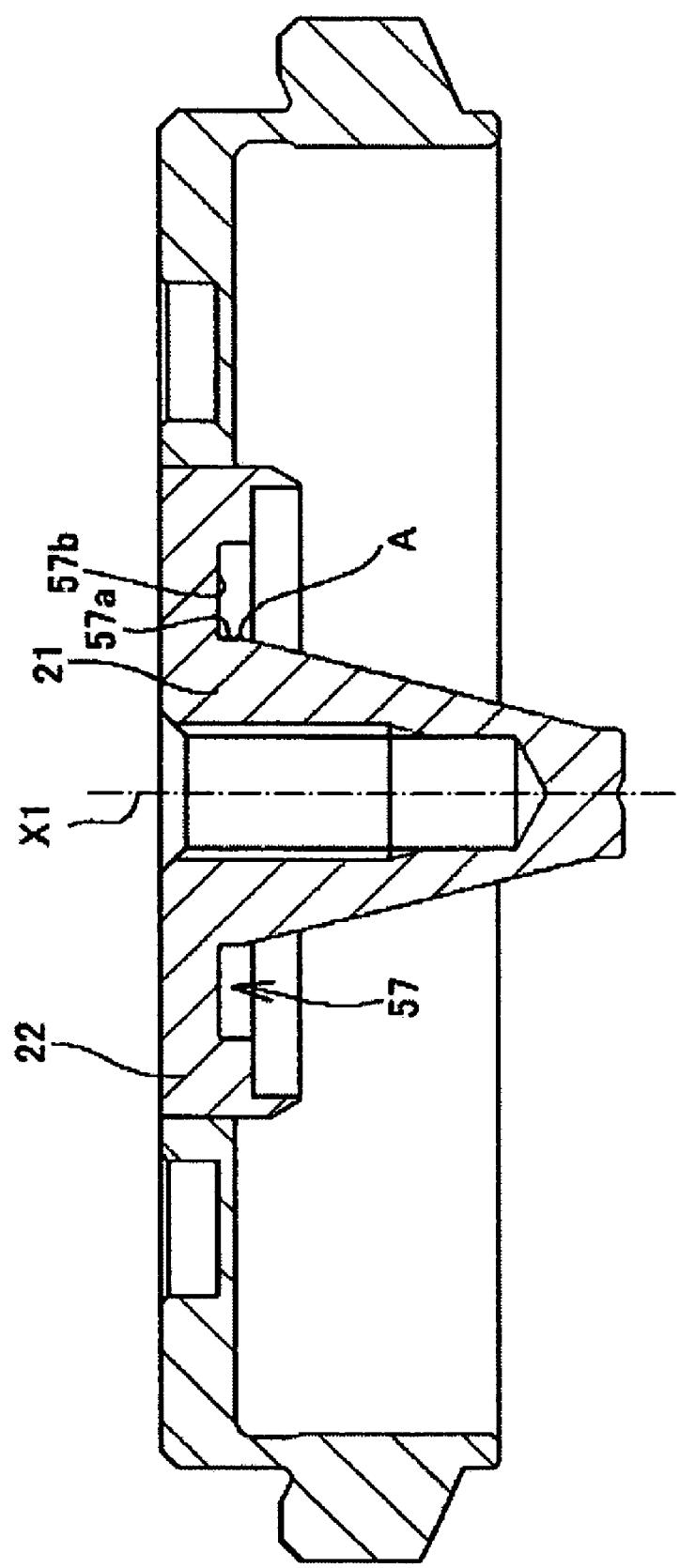
FIG. 7 is a vertical cross section showing an enlarged shaft bush with the integrated rotary hub used in another embodiment of the present invention.

In the embodiment shown in FIG. 7 in which the same codes are given to the same components in the above embodiments, a cutting reference surface 57 has a cylindrical annular wall 57a as a cutting reference surface in the radial direction formed at the larger diameter portion of the shaft bush 21 on the root base side and a ring-like annular flat surface 57b as a cutting reference surface in the axial direction circumferentially outside the cylindrical annular wall 57a. Even in such an embodiment, the same function/effects as in the above-described embodiment can be obtained.

Figure 8:
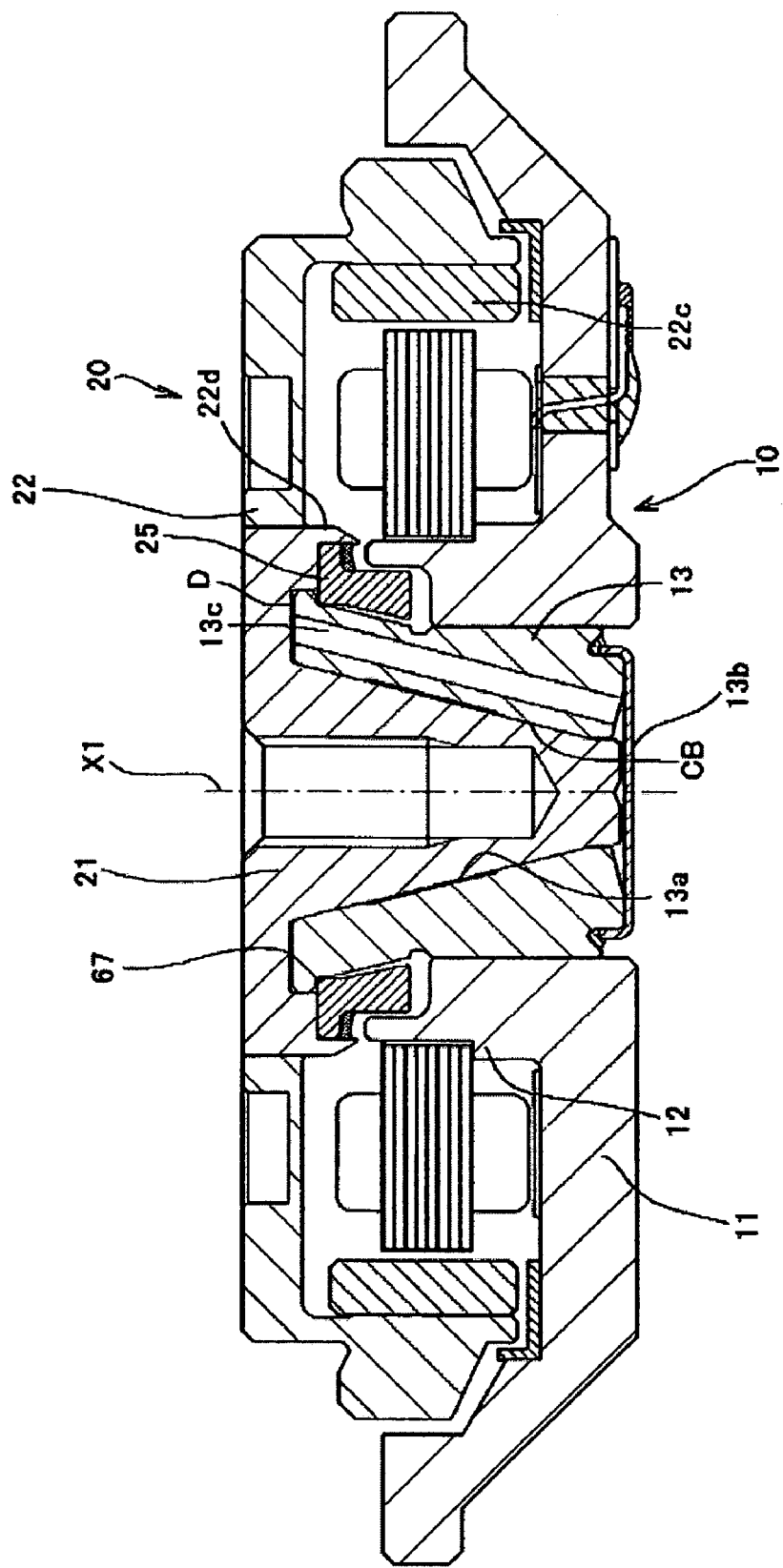
FIG. 8 is a vertical cross section showing a shaft-rotary-type HDD spindle motor having a conical hydrodynamic bearing device of another embodiment of the present invention.
Figure 9:
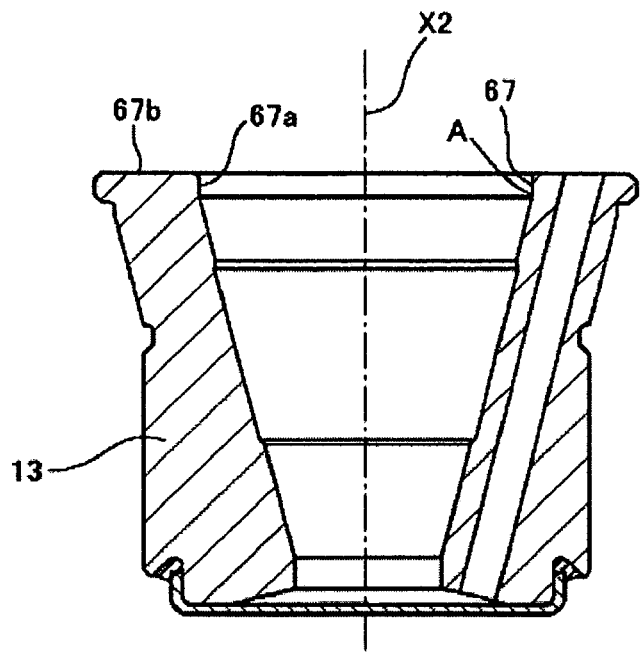
FIG. 9 is a vertical cross sectional diagram showing the enlarged bearing sleeve used in the HDD spindle motor of FIG. 8.

In the embodiments shown by FIGS. 8 and 9 in which the same codes are given to the same components as in the above-described embodiments, a cutting reference surface 67 is provided at the bearing sleeve 13. In other words, the inclined dynamic pressure surface formed on the inner circumferential surface of the bearing sleeve 13 in this embodiment is cut through a cutting process (NC process) using a proper cutting tool, and is specifically cut continuously in a predetermined cutting direction from the cutting start edge A, which is provided in advance at the larger diameter portion of the bearing sleeve 13 at the top end of the figure, toward the smaller diameter portion at the bottom end of the figure.

Upstream in such a cutting direction from the cutting start edge A of the inclined dynamic pressure surface, i.e., at the top end portion of the bearing sleeve 13 in the figure, the cutting reference surface 67 is provided to detect the position of the cutting tool in advance. This cutting reference surface 67 consists of a cylindrical annular wall 67a, which is used for detecting the position of the tool in the radial direction, and a ring-like annular flat surface 67b, which is used for detecting the position of the tool in the axial direction. The cylindrical annular wall 67a and the ring-like annular flat surface 67b are cut integrally and continuously with the inclined dynamic pressure surface.

More specifically, the cylindrical annular wall 67a configuring the cutting reference surface in the radial direction is formed to be concentric with the center axis X2 of the bearing sleeve 13, and is cut integrally and continuously with the cutting start edge A of the inclined dynamic pressure surface in the axial direction. Also, the ring-like annular flat surface 67b configuring the cutting reference surface in the axial direction is provided by using the top surface of the bearing sleeve 13 in the figure, and extends from the axial end portion of the cylindrical annular wall 67a in the direction orthogonal to the wall 67a. Even with the bearing sleeve 13 having such a cutting reference surface 67, the same function/effects as in the above-mentioned embodiments can be obtained.

Figure 10:
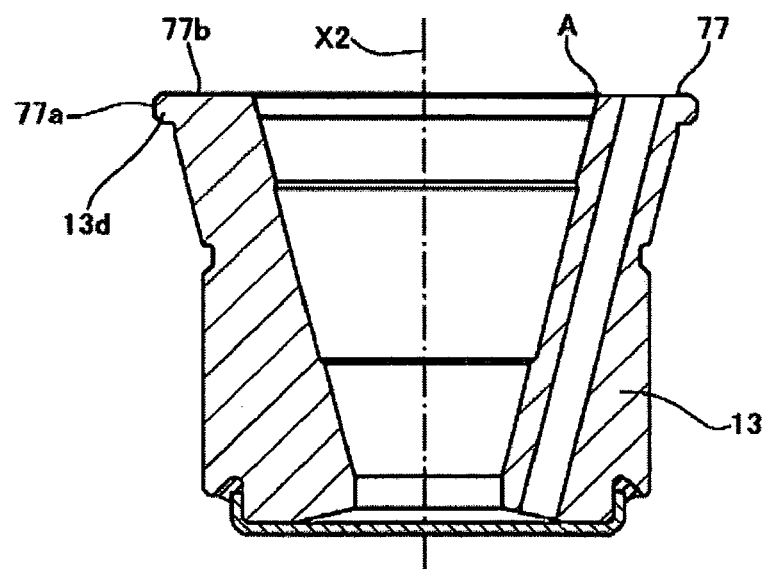
FIG. 10 is a vertical cross sectional diagram showing the enlarged bearing sleeve in another embodiment of the present invention.

In the embodiment illustrated in FIG. 10, the inclined dynamic pressure surface of the bearing sleeve 13 reaches the top end of the figure; a cylindrical annular wall 77a, configuring the cutting reference surface 77 in the radial direction of this embodiment, is provided by using the outmost circumferential surface of the stopper engaging flange portion 13d formed at the top end portion of the bearing sleeve 13 in the figure. A ring-like annular flat surface 77b, configuring the cutting reference surface in the axial direction, is provided by using the top surface of the bearing sleeve 13 in the figure and extends from the axial end portion of the cylindrical annular wall 77a along the direction orthogonal to the wall 77a. Even with the bearing sleeve 13 having such a cutting reference surface 77, the same function/effect as in the above-mentioned embodiments can be obtained.

In the embodiment illustrated in FIG. 11 in which the same codes are given to the components corresponding to those in the hard disk drive (HDD) of FIG. 1, an annular stopper ring 21a is fixed to the tip end portion of the shaft bush 21 at the bottom end of the figure. The stopper ring 21a is arranged inside the storage portion 13e formed as a recess in the center portion of the bearing sleeve 13 at the bottom end of the figure. In this positional relationship, the stopper ring prevents the rotor assembly 20 from coming off. Even in such an embodiment, the same function/effects can be obtained as those in the above-mentioned embodiment.

Figure 12:
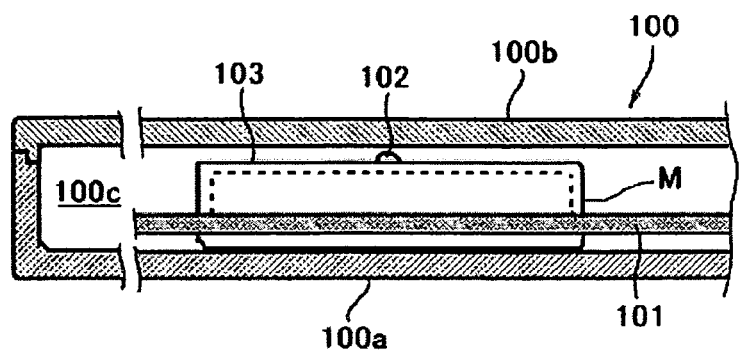
FIG. 12 is a vertical cross sectional diagram showing a structure of an information disk drive device that uses a spindle motor having the conical hydrodynamic bearing device of the present invention.
Figure 13:
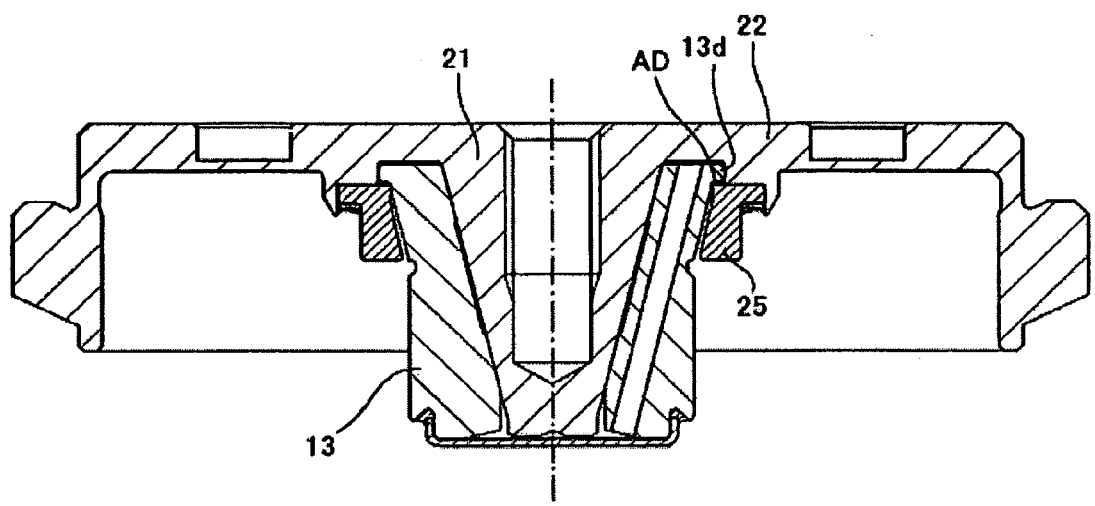
FIG. 13 is a vertical cross sectional diagram showing the configuration in which a shaft bush with an integrated rotary hub used in a conventional HDD spindle motor is coupled with a bearing sleeve.
Figure 14:
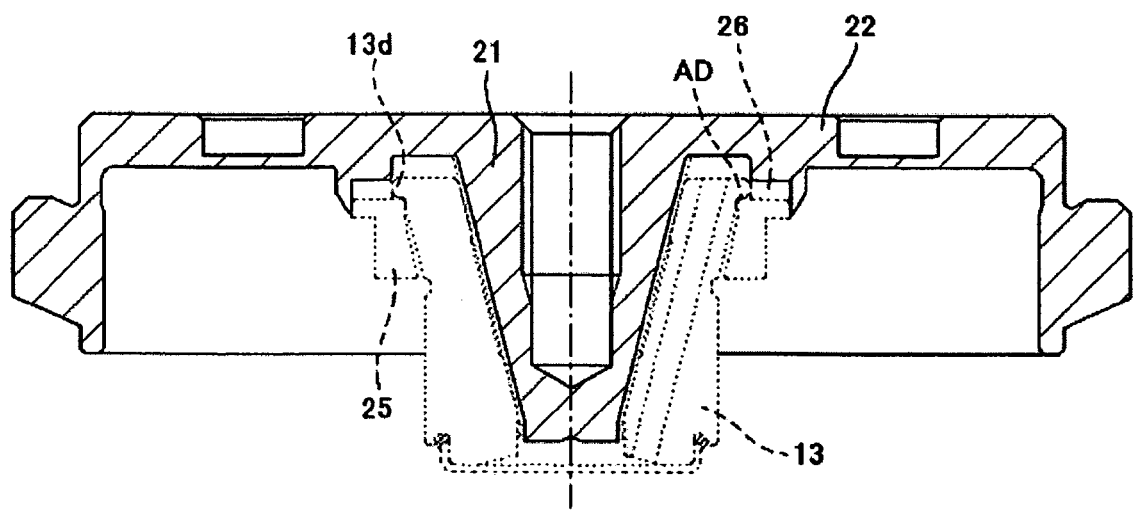
FIG. 14 is a vertical cross sectional diagram showing the configuration in which a shaft bush with an integrated rotary hub used in a conventional HDD spindle motor is coupled with a bearing sleeve via a spacer.

The spindle motor of each embodiment is mounted inside a hard disk drive (HDD) as illustrated in FIG. 12. As illustrated in FIG. 12, a spindle motor M having a conical hydrodynamic bearing device of any one of the above-described embodiments is fixed to a main plate 100a that configures a sealed housing 100; the internal space of the housing 100 which now stores the spindle motor M is made to be a clean space 100c by covering it with a sealing lid 100b that fits to the main plate 100a. An information recording disk 101 such as a hard disk is mounted onto the rotary hub (see code 22 of FIG. 1) of the spindle motor M, and is held unmovable by a clamp 103 fixed to the rotary hub with a screw 102.

Although the invention devised by the present inventors has been described in detail based on the embodiments, it is not limited to those embodiments, but can be varyingly modified within the scope of the invention.

For example, in each embodiment described above, the cutting reference surface is provided upstream in the cutting direction from the cutting start edge A, the position of the cutting tool is first identified using a cutting reference surface, and then the inclined dynamic pressure surface is cut. However, the present invention is not limited to this, but the cutting reference surface may be provided downstream in the cutting direction from the cutting start edges A, and the cutting reference surface may be cut after cutting the inclined dynamic pressure surface; the position of the cutting tool which is identified at that time can be used as a correction value for the next cutting process.

Or, the cutting reference surface may be first cut downstream from the cutting start edge A in the cutting direction; the axial position and radial position of the cutting tool may be measured based on the cutting reference surface; based on the measurement result, the cutting is performed from the cutting start edge A toward the cutting reference surface.

In the above-described embodiments, the present invention is applied to a spindle motor for a hard disk drive (HDD). However, the present invention can be applied to various other kinds of conical hydrodynamic bearing devices in the same manner.

As described above, in the conical hydrodynamic bearing device of one aspect of the present invention, the open angle θ1 created by a pair of generatrixes in the inclined dynamic pressure surface of the shaft bush which is relatively rotatably inserted into the bearing sleeve is set to be larger than the open angle θ2 created by a pair of generatrixes in the inclined dynamic pressure surface of the bearing sleeve (θ1>θ2). With this, a large bearing rigidity at the larger diameter portion is efficiently used to obtain the bearing property of higher rigidity. In this manner, the decrease in the amount of float [of the rotor assembly] which is normally caused by a manufacturing error on the inclined dynamic pressure surface is reduced, lessening the restriction on manufacturing tolerance. Consequently, the performance of the conical hydrodynamic bearing device can be improved inexpensively.

In the conical hydrodynamic bearing device of another form of the present invention, the dynamic pressure generating means described above is composed of a collection of properly-shaped recessed grooves which are spaced at a proper pitch in the axial direction. Therefore, the above-mentioned excellent effects can be obtained even in the conical hydrodynamic bearing device having the dynamic pressure generating means configured as above.

As described above, in the conical hydrodynamic bearing device of the manufacturing method of a conical hydrodynamic bearing device of the present invention, in order to cut a conical inclined dynamic pressure surface on either a shaft bush or bearing sleeve with a proper cutting tool continuously with a cutting start edge along a predetermined direction, a gap reference surface and a cutting reference surface are formed integrally and continuously with the inclined dynamic pressure surface of either the shaft bush or bearing sleeve or a member integrated with either of the above-mentioned members, the gap reference surface being used for creating a reference gap in the axial direction between the shaft bush and bearing sleeve and the cutting reference surface being used for detecting the position of the cutting tool in the radial direction and in the axial direction; the cutting reference surface used for detecting the position of the cutting tool in the axial and radial directions is cut integrally and continuously with the inclined dynamic pressure surface; the position of the cutting tool is measured/identified through a cutting process on the cutting reference surface so that a more precise cutting of the inclined dynamic pressure surface can be performed easily. Accordingly, an inexpensive conical hydrodynamic bearing device of high performance can be obtained.

In the conical hydrodynamic bearing device of yet another form of the invention, the cutting reference surface is positioned upstream or downstream in the cutting direction from the cutting start edge of the inclined dynamic pressure surface. In the conical hydrodynamic bearing device of still another form of the invention, the cutting reference surface is cut before or after cutting the inclined dynamic pressure surface so that the cutting of the cutting reference surface can be done either before or after cutting the inclined dynamic pressure surface. In addition to the fact that the above-mentioned effects can be obtained, more freedom can be given to production.

In the conical hydrodynamic bearing device of a different aspect of the invention, the cutting reference surface consists of the cylindrical annular wall, which is concentric with the center axis of the shaft bush, and the ring-like annular flat surface, which is orthogonal to the center axis of the shaft bush, so that the position of the cutting tool can be identified in two directions to make more precise cutting. Thus, the above-mentioned effects can be obtained with more certainty.

In the conical hydrodynamic bearing device of a different form of the invention, the cutting reference surface is provided continuously with either the larger diameter end portion or smaller diameter end portion of the inclined dynamic pressure surface so that the inclined dynamic pressure surface can be cut from either the larger diameter side or smaller diameter side in the same manner. Accordingly, in addition to the fact that the above-mentioned effects can be obtained, more freedom in cutting the inclined dynamic pressure surface can be given.

In the conical hydrodynamic bearing device of a form of the invention, an axial end portion of the shaft bush is integrated or joined as a separate member with the holding member for a body-to-be-rotated, and the other axial end of the shaft bush is projected toward the area axially outside the body-to-be-rotated holding member, so that the outer diameter of the tip end portion of the shaft bush can be measured by a measuring device easily and precisely without hindrance by the body-to-be-rotated holding member. Therefore, in addition to the fact that the above-mentioned effects are obtained, quality of the product can be improved.

In the recording disk drive device still a different form of the invention, information is recorded/reproduced by a recording head with respect to the information recording disk mounted on the rotor of the spindle motor which uses a specific form, the conical hydrodynamic bearing device. Therefore, the above-mentioned effects can be obtained even in the recording disk drive device.

In the manufacturing method of a conical hydrodynamic bearing device according to the invention, the cutting reference surface of is positioned upstream or downstream in the cutting direction from the cutting start edge of the inclined dynamic pressure surface. In the manufacturing method of a conical hydrodynamic bearing device of the invention, the cutting reference surface is cut before or after cutting the inclined dynamic pressure surface so that it can be cut either before or after cutting the inclined dynamic pressure surface. In addition to the fact that the above-mentioned effects are obtained, more freedom in production can be obtained.

In the manufacturing method of a conical hydrodynamic bearing device of the invention, the cutting reference surface of the invention and the inclined dynamic pressure surface are cut by the same cutting tool so that the cutting of the inclined dynamic pressure surface can be performed in a positional relationship perfectly corresponding to the position of the cutting tool which is identified by the cutting reference surface. Therefore, the above-mentioned effects can be obtained with certainty.

While the foregoing description and drawings represent the present invention, it will be obvious to those skilled in the art that various changes may be made therein without departing from the true spirit and scope of the present invention.

What is claimed is:

1. A conical hydrodynamic bearing device comprising:
    a shaft bush having a conical inclined dynamic pressure surface around an outer circumference thereof being relatively-rotatably inserted in a bearing sleeve having a conical inclined dynamic pressure surface around an inner circumference thereof, so that a conical inclined bearing space is created in a gap between said inclined dynamic pressure surfaces of said bearing sleeve and shaft bush;
    a lubricant fluid being filled inside said inclined bearing space;
    a proper dynamic pressure generating means being formed on at least one of said inclined dynamic pressure surfaces of said shaft bush and bearing sleeve;
    said lubricant fluid being pressurized by said dynamic pressure generating means to generate dynamic pressure, by which said shaft bush and said bearing sleeve are relatively elevated in the radial and thrust directions so that their rotations are supported in a non-contact manner;
    wherein an open angle $\theta 1$ created by a pair of generatrixes between which a plane including the center axis of said shaft bush intersects with said inclined dynamic pressure surface of said shaft bush being set to be larger than an open angle $\theta 2$ created by a pair of generatrixes between which a plane including said center axis of said bearing sleeve intersects with said inclined dynamic pressure surface of said bearing sleeve ($\theta 1 > \theta 2$).

2. The conical hydrodynamic bearing device as set forth in claim 1, wherein said dynamic pressure generating means is composed of a group of properly-shaped recessed grooves which are spaced at a proper pitch in the axial direction.

3. A conical hydrodynamic bearing device, comprising:
    a shaft bush having a conical inclined dynamic pressure surface around an outer circumference thereof being relatively-rotatably inserted in a bearing sleeve having a conical inclined dynamic pressure surface around an inner circumference thereof,
    said inclined dynamic pressure surface of at least either said shaft bush or said bearing sleeve being formed continuously from the cutting start edge along the predetermined cutting direction through a cutting process with a proper cutting tool;
    lubricant fluid being filled in said conical inclined bearing space which is created in the gap between said inclined dynamic pressure surfaces of said bearing sleeve and shaft bush;

a proper dynamic pressure generating means being formed on at least one of said inclined dynamic pressure surfaces of said shaft bush and bearing sleeve;

said lubricant fluid being pressurized by said dynamic pressure generating means to generate dynamic pressure, by which said shaft bush and said bearing sleeve are relatively elevated in the radial direction and in the thrust direction so that their rotations are supported in a non-contact manner;

wherein a gap reference surface which is used for creating a reference gap between said shaft bush and said bearing sleeve in the axial direction is cut integrally with said inclined dynamic pressure surface on at least either said shaft bush or said bearing sleeve or a member integrated with either said member, and a cutting reference surface which is used for detecting the position of said cutting tool in the radial direction and in the axial direction being formed continuously and integrally with said inclined dynamic pressure surface on at least either said shaft bush or said bearing sleeve.

4. The conical hydrodynamic bearing device as set forth in claim 3 wherein said cutting reference surface is located upstream or down stream in the cutting direction from the cutting start edge of said inclined dynamic pressure surface.

5. The conical hydrodynamic bearing device as set forth in claim 3 wherein said cutting reference surface is formed before or after cutting said inclined dynamic pressure surface.

6. The conical hydrodynamic bearing device as set forth in claim 3 wherein said cutting reference surface includes a cylindrical annular wall surface, which is concentric with the center axis of said shaft bush, and a ring-like annular flat surface orthogonal to said center axis of said shaft bush.

7. The conical hydrodynamic bearing device as set forth in claim 3 wherein said cutting reference surface is formed continuously with either the larger diameter end portion or the smaller diameter end portion of said inclined dynamic pressure surface.

8. The conical hydrodynamic bearing device as set forth in claim 3 wherein one axial end of said shaft bush is integrated or joined as a separate unit with a holding member for a body-to-be-rotated, and the other axial end of said shaft bush projects toward the area which is axially outside of said body-to-be-rotated holding member.

9. A recording disk driving device comprising:
   a spindle motor having the conical hydrodynamic bearing device of claim 3;
   an information recording disk mounted onto a rotor of said spindle motor; and
   a recording head for recording and reproducing the information with respect to said information recording disk.

10. A method of manufacturing a conical hydrodynamic bearing device comprising the steps of:
    relatively rotatably inserting a shaft bush having a conical inclined dynamic pressure surface around the outer circumference thereof in a bearing sleeve having a conical inclined dynamic pressure surface around the inner circumference thereof; and
    forming at least either said inclined dynamic pressure surface of said shaft bush or that of said bearing sleeve continuously from the cutting start edge along a predetermined cutting direction through a cutting process by a proper cutting tool;
    filling lubricant fluid in a conical inclined bearing space which is created in a gap between said inclined dynamic pressure surfaces of said shaft sleeve and shaft bush;
    forming a proper dynamic pressure generating means on at least one of said inclined dynamic pressure surfaces of said shaft bush and bearing sleeve;
    pressurizing said lubricant fluid by said dynamic pressure generating means to generate dynamic pressure, with which said shaft bush and said bearing sleeve are relatively elevated in the radial and thrust directions so that their rotations are supported in a non-contact manner;
    cutting a gap reference surface, which is used for creating a reference gap in the axial direction between said shaft bush and said bearing sleeve integrally and continuously with said inclined dynamic pressure surface in either said shaft bush or said bearing sleeve or a member integrated with either said member;
    when said inclined dynamic pressure surface is cut by said cutting tool, forming a cutting reference surface which is used for detecting the position of said cutting tool in the radial and axial directions continuously and integrally with said inclined dynamic pressure surface;
    measuring the position of said cutting tool by the cutting of said reference surface by said tool; and
    continuously cutting said inclined dynamic pressure surface based on said measured position of said cutting tool.

11. The method of manufacturing a conical hydrodynamic bearing device as set forth in claim 10, wherein said cutting reference surface is located upstream or downstream in said cutting direction from said cutting start edge of said inclined dynamic pressure surface.

12. The method of manufacturing a conical hydrodynamic bearing device as set forth in claim 10, wherein said cutting reference surface is formed before or after cutting said inclined dynamic pressure surface.

13. The method of manufacturing a conical hydrodynamic bearing device as set forth in claim 10, wherein said cutting reference surface and said inclined dynamic pressure surface are cut by the same cutting tool.

* * * * *